Patented Mar. 25, 1947

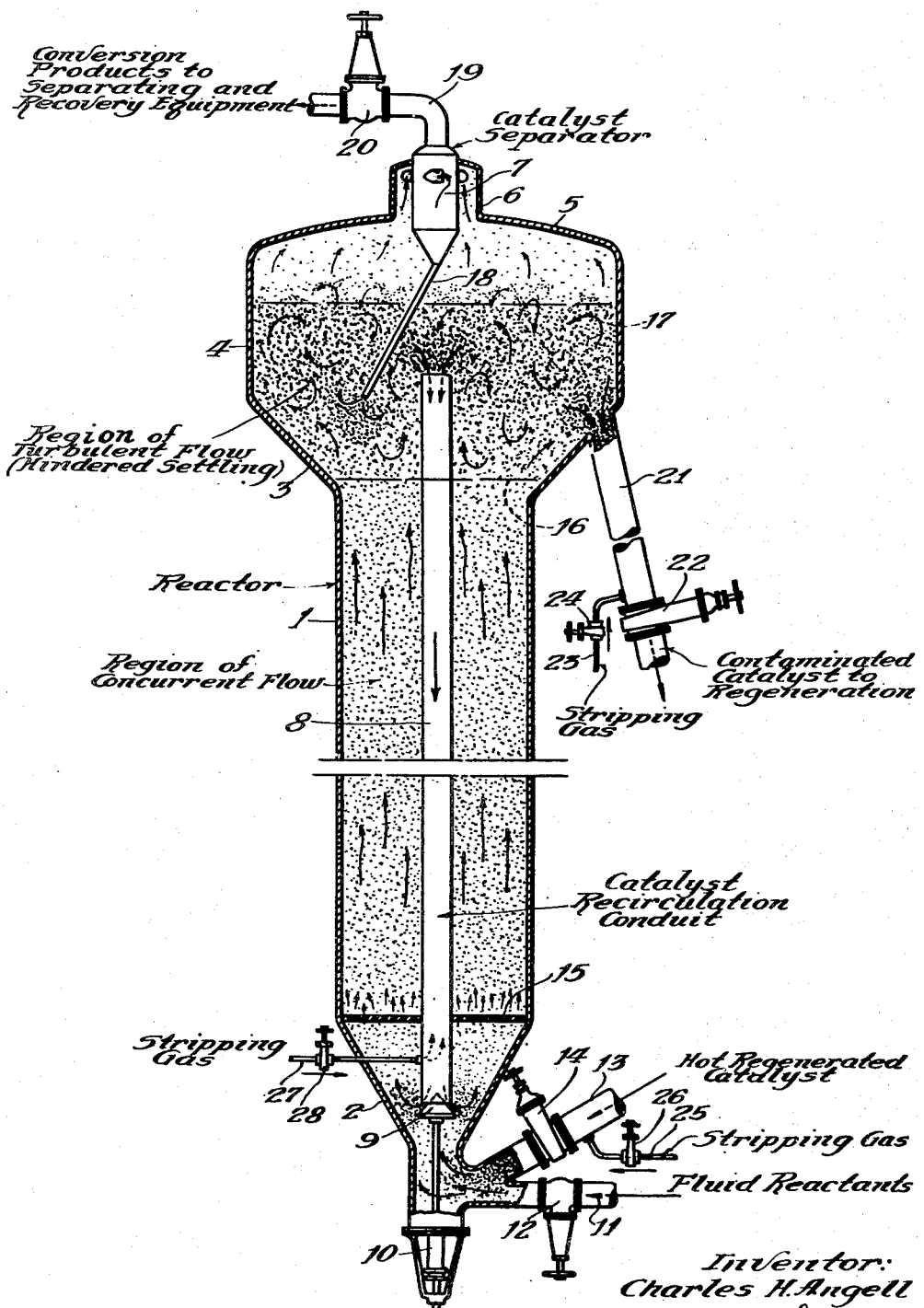

2,418,003

UNITED STATES PATENT OFFICE 2,418,003

CATALYTIC CONVERSION OF FLUID REACTANTS

Charles H. Angell, Chicago, Ill., assignor to Universal Oil Products Company, Chicago, Ill., a corporation of Delaware Application June 4, 1943, Serial No. 489,598

9 Claims. (Cl. 196—52)

The invention relates to an improved process for the conversion of fluid reactants in the presence of subdivided solid catalyst which promotes the desired reaction or retards undesirable side reactions, or in the presence of relatively inert subdivided solid contact material.

The invention is particularly directed to catalytically promoted hydrocarbon conversion reactions, such as cracking, dehydrogenation, aromatization or cyclization, reforming and the like, but its features will be advantageous as applied to other reactions conducted in the presence of subdivided solid contact material or catalyst and, in its broad aspects, the invention is not limited to any specific reaction. Of the various hydrocarbon conversion reactions now known to those conversant with the art of oil refining, catalytic cracking and catalytic dehydrogenation are the most widely practiced and probably the best understood. They have therefore been chosen to illustrate the features and advantages of the invention.

A type of catalytic cracking process which has recently come into prominence and has been widely adopted commercially is known as the "fluid bed" type of operation. There are several modifications of this general process, but its commercialized forms all embody the use of a fluid-like bed of subdivided solid catalyst particles maintained within an enlarged vertically disposed cylindrical reaction vessel and kept in a state of turbulent agitation by an upwardly flowing stream of the hydrocarbon vapors to be converted and the resulting vaporous and gaseous conversion products. This type of operation has numerous well recognized advantages over the so-called "fixed bed" type of operation employing two or more reaction vessels containing a static catalyst bed and each alternately employed as a zone in which the cracking reaction is conducted and as a zone in which contaminating combustible deposits accumulated on the catalyst particles are burned therefrom in a stream of oxidizing gas to restore the activity of the catalyst. Fluid bed operation permits continuous processing of the hydrocarbon vapors and reactivation of the catalyst in separate reaction and regenerating vessels between and through which the catalyst is conveniently circulated due to its fluid-like condition. It has numerous other less outstanding but important advantages.

It has recently been found, however, that the fluid bed type of operation, as it is now known, has some disadvantages which result from the turbulence and mixing obtained in the fluid-like catalyst bed. This turbulence is due to the recirculation of catalyst particles caused by their hindered settling in the fluid bed due to the greater effect of gravity on the solid particles than on the vapors and gases employed to fluidize the same. The result of this turbulence or hindered settling is lack of uniformity with respect to the residence time of the catalyst particles in the fluid bed. To obtain hindered settling, the upward velocity of the vapor and gas in the fluid bed is correlated with the average size and density of the catalyst particles so that the average upward rate of flow of the vapors and gases is greater than that of the catalyst particles. The degree of turbulence and hindered settling is not controllable independent of the vapor and gas velocities and the particle size and the density of the catalyst. Reduced to practical considerations this means that some catalyst particles remain in the fluid bed much longer than others and the average activity of the catalyst in the fluid bed is a function of its average residence time therein, as well as its activity when it enters the fluid bed.

This disadvantage of limited control or lack of positive control over the activity of the catalyst mass, as encountered in fluid bed operation, is not characteristic of that type of operation in which catalyst particles move through the reaction zone either countercurrent to or concurrent with the reactants and conversion products. However, operations of the latter type, as previously practiced, have other disadvantages which are not characteristic of the fluid bed type of operation. For example, concurrent or streamline flow with the catalyst particles suspended and moving upwardly with the gas stream at substantially the same rate of flow as the gas has been characterized by a low concentration of catalyst particles in the flowing gas stream with the result that thermal cracking is encouraged to the detriment of catalytic cracking. The same is generally true of countercurrent flow in operations of the type in which the catalyst particles are rained downwardly through an ascending stream of the reactants and the resulting conversion products. It is, of course, possible to obtain an even higher catalyst concentration than that obtainable in fluid bed operation by employing a relatively compact mass of catalyst particles moving countercurrent to the stream of reactants and conversion products. However, this results in relatively high pressure drop through the bed when the latter is relatively deep. This is a disadvantage in such reactions as catalytic cracking and dehydrogenation where low pressure must be employed throughout the reaction zone to repress thermal conversion and favor the catalytic reaction. On the other hand, sufficient contact time between the catalyst and the reactants cannot be obtained in relatively thin compact catalyst beds unless the vapor velocity through the bed is low and, to obtain a reasonable capacity in a shallow bed with good contact time, the bed must be of relatively large cross-section in a direction transverse to the flow of the reactants. This leads to difficulties in the design of the reaction vessel to obtain satisfactory uniform distribution of the reactants across the bed.

The present invention seeks to avoid or materially reduce the aforementioned difficulties encountered in each of the types of operation above mentioned. This is accomplished by employing a combination of stream-line or concurrent flow and hindered settling with the zone of hindered settling disposed above the zone of concurrent flow and with the controlled recirculation of catalyst from the zone of hindered settling to and through the zone of concurrent flow. This rate of recirculation is preferably controlled to give a catalyst concentration in the zone of concurrent flow closely approaching that at which hindered settling would result in this zone or within the range at which some hindered settling is present but is not pronounced. In other words, the incoming stream of fluid reactants is loaded with recirculated and incoming fresh or regenerated catalyst to approximately the point where hindered settling of the catalyst particles is first obtained. This will give a sufficiently high catalyst concentration in the zone of concurrent flow to avoid excessive thermal conversion of the reactants. Also, in this operation the region in which pronounced hindered settling is obtained is of relatively small volume in comparison with the region of concurrent flow and is located at a point in the reaction zone at which the reactants have already undergone considerable conversion and are relatively immune to extensive further conversion in contact with the catalyst present. Thus, hindered settling is not particularly detrimental in this region and is employed to advantage to facilitate control of the recirculation of the catalyst particles therefrom to adjacent the inlet of the reaction zone and to facilitate transfer of the catalyst particles from this region to the regenerating zone.

The advantages achieved by the type of operation herein provided are common to catalytic cracking and to catalytic dehydrogenation, as well as numerous other specific reactions. There are also other advantages particularly as applied to the catalytic dehydrogenation of hydrocarbons and other operations which are similar in that the desired reaction tends to reach equilibrium before certain undesirable secondary or side reactions have reached equilibrium and in which the recirculation of catalyst and conversion products through the reaction zone is detrimental. With hindered settling, as encountered in the fluid bed type of operation, the absorption or occlusion of products of the dehydrogenating reaction in or on the catalyst particles and their recirculation with the latter is inherent due to the relatively porous nature of the catalysts commonly employed. This recirculation and build up of the dehydrogenated products represses the desired dehydrogenating reaction without repressing the undesired secondary or side reactions to the same extent, with the result that lower conversion efficiencies are obtained. To avoid this, in the process provided by the invention as applied, for example, to catalytic dehydrogenation, the catalyst recycled from the region of hindered settling to the region of concurrent flow is substantially stripped in transit of the volatile dehydrogenated products so that controlled recirculation of the catalyst is obtained without pronounced recirculation of the dehydrogenated products.

The accompanying diagrammatic drawing is an elevational view, shown principally in section, of a reaction vessel embodying the features of the invention and in which the improved mode of operation provided by the invention may be conducted.

Referring to the drawing, the reaction vessel comprises an elongated substantially vertical cylindrical section 1 provided with a substantially conical lower head 2 and connected by a sloping wall 3 at its upper end with another substantially cylindrical section 4 which is materially shorter than section 1 and of materially larger diameter. The vessel is provided, in the case illustrated, with a semi-elliptical upper head 5 having an extended portion 6 in which a centrifugal or cyclone separator 7 is mounted.

A substantially-vertical catalyst return conduit or standpipe 8 is disposed centrally within the vessel and extends from the space enclosed by section 4 into the conical lower end 2. The conduit 8 is open at its upper end and the movable flow-regulating member 9 of valve 10 is disposed adjacent its lower end to adjustably restrict the opening therefrom.

In operation, fluid reactants to be converted, such as, for example, hydrocarbon oil or hydrocarbon vapor or gas is supplied to the lower end of the vessel through the inlet conduit 11, controlled by valve 12, and fresh catalyst and/or regenerated catalyst from suitable regenerating equipment, not illustrated, is likewise supplied to the lower end of the vessel through conduit 13, containing a suitable adjustable orifice or flow control valve, as indicated at 14. The commingled fluid reactants and catalyst are distributed substantially uniformly across the cylindrical section of the vessel and, when desired, a suitable distributing grid, such as the perforate plate indicated at 15, may be provided adjacent the lower end of section 1 of the vessel to insure good distribution of the catalyst and reactants. The catalyst particles are borne upwardly through the relatively small diameter section 1 of the vessel by the lifting action of the fluid reactants and resulting fluid conversion products, and the commingled materials enter the enlarged upper section 4 where the reduction in lineal velocity causes hindered settling of the catalyst particles and turbulence in this portion of the bed.

The approximate line of demarkation between the region of concurrent flow and the higher region of turbulent flow or hindered settling is indicated by the broken line 16. The density or catalyst concentration in that portion of the bed where pronounced hindered settling is obtained is somewhat greater than the density and catalyst concentration in the lower region where the flow of catalyst, reactants and conversion products is essentially concurrent. There is also a region of materially lower density and lower catalyst concentration above the turbulent portion of the bed in the extreme upper portion of the reactor. The approximate line of demarkation between this light phase region and the lower dense phase region in section 4 of the vessel is indicated by the broken line 17.

To keep the catalyst concentration in section 1 of the vessel at a relatively high value, catalyst from the turbulent dense phase region in section 4 is directed downwardly through conduit 8 and admitted in controlled quantities by the regulation of valve 10 into the lower end of the vessel adjacent the point of introduction of the fresh or regenerated catalyst and the fluid reactants so that it is picked up by the latter and transported back through the region of concurrent flow into the upper section of the vessel. The recirculation of catalyst particles in this manner is controlled to prevent any marked degree of hindered settling in section 1 of the reactor, but preferably the concentration of catalyst in this section is kept at a value closely approaching the maximum obtainable without appreciable hindered settling. The catalyst concentration or density in this zone may be, for example, of the order of 10 to 15 pounds per cubic foot.

Due to pronounced hindered settling in the enlarged upper section of the reactor as a result of the reduced lineal velocity of the vapors in this zone, the catalyst concentration or density is higher and may be, for example, of the order of 15 to 30 pounds per cubic foot. The upper extremity of the fluid bed in the upper section of the reactor, represented by line 17, is a disengaging surface and the catalyst concentration above this approximate level is considerably reduced and may be, for example, of the order of 0.5 to 2 pounds per cubic foot.

The catalyst particle concentration or density figures given above exemplify those which will ordinarily prevail when using a powdered cracking catalyst of the silica-alumina type having an average particle size of the order of 50 microns with only a small amount below 20 micron size. The densities with a given type of catalyst for a given vapor or gas velocity will increase with an increase in particle size. The densities will also be greater for a heavier catalyst of the same particle size at the same gas or vapor velocity. For example, with alumina-chromia, dehydrogenating and aromatizing catalyst having a bulk density about twice as great as the silica-alumina cracking catalyst and of about the same average particle size, but containing a smaller amount of fines than the cracking catalyst, the densities in the fluidized beds average two to two and one-half times that of the densities which prevail with the cracking catalyst above mentioned. It will thus be seen that the density figures above given are only intended to show an approximate comparison between the densities or catalyst loadings in the three zones of the fluid bed (the zone of substantially concurrent flow, the zone of hindered settling and the light phase).

Fluid conversion products and the relatively small amount of entrained catalyst particles which they carry are directed from the light phase of the catalyst bed above line 17 into the catalyst separator 7, wherein a major portion of the entrained catalyst particles are separated by centrifugal action and from which the separated catalyst is returned through standpipe 18 to the turbulent dense phase of the catalyst bed, or it may, when desired, be supplied to conduit 8 or to the region of concurrent flow in section 1 of the reactor. Vaporous and/or gaseous conversion products are directed from the upper portion of separator 7 through line 19 and the pressure control valve 20 to suitable subsequent and separating equipment not pertinent to the present invention and, therefore, not illustrated.

To keep the catalyst in the reaction zone active, a stream of catalyst particles is continuously withdrawn from the turbulent dense phase region of the catalyst bed and directed through transfer line 21 and the adjustable orifice or flow-control valve 22 to a suitable regenerator, not illustrated, wherein contaminating combustible deposits are burned from the catalyst particles in a stream of oxidizing gas. Resulting hot regenerated catalyst is continuously returned from the reaction zone through transfer line 13 and the control valve 14 to the reactor and supplies to the reaction zone all or a substantial portion of the heat required for conducting the endothermic conversion reaction therein. A portion of the required heat is ordinarily supplied to the reactor by preheating the charging stock entering through line 11 to approximately the desired reaction temperature and it is also within the scope of the invention to supply heat of vaporization to the charging stock exterior to the reactor. The charging stock may, when desired, be supplied to the reaction zone in only partially vaporized or in liquid state. However, most or all of the endothermic heat of reaction is preferably carried to the reactor in the hot regenerated catalyst particles.

To keep the quantity of catalyst present in the reactor substantially constant, the rate of introduction of regenerated and any fresh catalyst supplied to this zone is controlled to correspond to the rate of removal of catalyst therefrom through line 21, plus any catalyst loss in the outgoing reaction and regeneration products, (i. e., not recovered in the separating equipment and returned to the system). Ordinarily, the rate of introduction of fresh catalyst will approximately correspond to the rate of catalyst loss, which is relatively small, and the catalyst inventory in the reactor may be maintained substantially constant by keeping the dense phase level (at line 17) substantially constant. This may be accomplished automatically, when desired, by a level controller set to regulate the opening through valve 14 in response and in inverse relation to minor variations in the dense phase level. Suitable means for accomplishing this method of control are now well known in the art and, therefore, an illustration is considered unnecessary to an understanding of the invention.

To substantially strip the stream or column of catalyst particles passing through transfer line 21 to the regenerator of readily vaporizable conversion products and reactants, a suitable stripping gas, such as steam, for example, is introduced into the transfer line at one or a plurality of points on the upstream side of valve 22. Line 23 and valve 24 are provided for this purpose in the case illustrated. Similar means comprising line 25 and valve 26 are provided for introducing stripping gas into line 13 on the upstream side of valve 14 to substantially strip the column of catalyst particles passing therethrough of oxidizing gas and combustion products. It is also desirable in some instances, such as previously mentioned, to substantially strip the column of catalyst particles passing through conduit 8 of readily vaporizable constituents, such as occluded and absorbed conversion products. This may be accomplished by introducing stripping gas, such as steam, light hydrocarbon gases or the like, into conduit 8 at one or a plurality of intermediate points. Line 27 and valve 28 are provided for this purpose in the case illustrated.

I claim:

1. In a process wherein hydrocarbon reactants are converted in the presence of a mass of subdivided solid catalytic material in a reaction zone, the improved mode of operation which comprises passing the hydrocarbons upwardly through a lower region, comprising a major portion of the length of the reaction zone, at a sufficiently high velocity to carry the solid particles of catalytic material upwardly therewith into a higher region of the reaction zone, maintaining in said lower region a sufficient temperature and a sufficient concentration of active catalyst particles to effect substantial conversion of the hydrocarbons during their passage through said lower region, maintaining in said higher region a relatively dense turbulent bed of catalyst particles and discharging the hydrocarbons and solid particles from said lower region upwardly into the lower portion of said dense turbulent bed, reducing the upward velocity of the hydrocarbons in said higher region sufficiently to effect substantial hindered settling of said solid particles therein, maintaining said higher region under conversion conditions and effecting further conversion of the hydrocarbons therein, returning regulated quantities of the solid catalytic material directly from said higher region to a relatively low point in said lower region to commingle therein with incoming hydrocarbon reactants and flow therewith back to said higher region, and maintaining a higher catalyst concentration in said turbulent bed in said higher region of the reaction zone than in said lower region of the reaction zone.

2. A process such as defined in claim 1, wherein the predominating conversion reaction is the catalytic cracking of hydrocarbons, said solid material being a cracking catalyst.

3. A process such as defined in claim 1, wherein the predominating conversion reaction is the catalytic cracking of normally liquid hydrocarbons, said solid material being a siliceous cracking catalyst.

4. A process such as defined in claim 1, wherein the predominating conversion reaction is the catalytic dehydrogenation of hydrocarbons, said solid material being a dehydrogenating catalyst.

5. A process such as defined in claim 1, wherein the predominating conversion reaction is the catalytic dehydrogenation of normally gaseous hydrocarbons, said solid material being a dehydrogenating catalyst.

6. A process such as defined in claim 1, wherein the predominating conversion reaction is the aromatization of hydrocarbons, said solid material being an aromatizing catalyst.

7. A process such as defined in claim 1, wherein the predominating conversion reaction is the aromatization of hydrocarbons boiling within the range of gasoline, said solid material being an aromatizing catalyst.

8. A process such as defined in claim 1, wherein the solid material being returned from said upper to said lower region of the reaction zone is substantially stripped of volatile conversion products of said reaction before it comes in contact with said incoming reactants.

9. A process such as defined in claim 1, wherein the concentration of solid particles in said upper region is one and one-half to three times the solid particle concentration in said lower region.

CHARLES H. ANGELL.

REFERENCES CITED

The following references are of record in the file of this patent:

UNITED STATES PATENTS

| Number | Name | Date |
|---|---|---|
| 1,355,105 | Canon | Oct. 5, 1920 |
| 1,984,380 | Odell | Dec. 18, 1934 |
| 2,326,705 | Thiele et al. | Aug. 10, 1943 |
| 2,327,175 | Conn | Aug. 17, 1943 |
| 2,337,684 | Scheineman | Dec. 28, 1943 |
| 2,341,193 | Scheineman | Feb. 8, 1944 |
| 2,347,682 | Gunness | May 2, 1944 |
| 2,378,342 | Voorhees et al. | June 12, 1945 |
| 2,378,607 | Watts | June 19, 1945 |